(12) United States Patent
Namioka

(10) Patent No.: US 11,966,836 B2
(45) Date of Patent: Apr. 23, 2024

(54) DETECTION SYSTEM AND DETECTION METHOD FOR USING A NEURAL NETWORK TO DETECT A PROFICIENCY OF A WORKER

(71) Applicant: KABUSHIKI KAISHA TOSHIBA, Minato-ku (JP)

(72) Inventor: Yasuo Namioka, Nerima (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 1366 days.

(21) Appl. No.: 16/101,925

(22) Filed: Aug. 13, 2018

(65) Prior Publication Data
US 2019/0065949 A1    Feb. 28, 2019

(30) Foreign Application Priority Data

Aug. 25, 2017 (JP) .................. 2017-162301

(51) Int. Cl.
*G06N 3/08* (2023.01)
*G06F 18/214* (2023.01)
(Continued)

(52) U.S. Cl.
CPC ............. *G06N 3/08* (2013.01); *G06F 18/214* (2023.01); *G06N 3/044* (2023.01); *G06N 3/045* (2023.01)

(58) Field of Classification Search
CPC .......... G06N 3/08; G06N 3/044; G06N 3/045; G06F 18/214
See application file for complete search history.

(56) References Cited

U.S. PATENT DOCUMENTS 11,556,879 B1 * 1/2023 Timmons .................. G06T 7/20
2013/0262352 A1 * 10/2013 Sung ...................... G06N 20/00
706/12

(Continued)

FOREIGN PATENT DOCUMENTS

| JP | 2558943 | 11/1996 |
| JP | 2003-167613 | 6/2003 |
| JP | 5324418 | 10/2013 |

OTHER PUBLICATIONS

Du Hierarchical Recurrent Neural Network for Skeleton Based Action Recognition, 2015 IEEE Conference on Computer Vision and Pattern Recognition, 2015 (Year: 2015).*

(Continued)

*Primary Examiner* — Aniss Chad
*Assistant Examiner* — Shien Ming Chou
(74) *Attorney, Agent, or Firm* — Oblon, McClelland, Maier & Neustadt, L.L.P.

(57) ABSTRACT

According to one embodiment, a detection system includes an acquirer, a trainer, and a detector. The acquirer acquires first data, second data, and third data. The first data is based on an action of a first body part in a first work of a first worker having a first proficiency. The second data is based on an action of the first body part in the first work of a second worker having a second proficiency. The third data is based on an action of the first body part in the first work of a third worker. The trainer trains a recurrent neural network including a first output layer using the first data and the second data. The detector inputs the third data to the trained recurrent neural network and detects a response of the first neuron or the second neuron.

16 Claims, 11 Drawing Sheets

(51) Int. Cl.
    *G06N 3/044*     (2023.01)
    *G06N 3/045*     (2023.01)

(56) References Cited

U.S. PATENT DOCUMENTS

2014/0363074 A1* 12/2014 Dolfing ................. G06F 40/129
    382/161
2017/0336878 A1* 11/2017 Iyer ....................... G06F 3/0346
2018/0353836 A1* 12/2018 Li ........................... A63B 71/06

OTHER PUBLICATIONS

Ibrahim A Hierarchical Deep Temporal Model for Group Activity Recognition, arXiv, Apr. 2016 (Year: 2016).*
Williams a Learning Algorithm for Continually Running Fully Recurrent Neural Networks, College of Computer Science, Northeastern University, 1989 (Year: 1989).*
Du, Y. et al., "Hierarchical Recurrent Neural Network for Skeleton Based Action Recognition", IEEE Computer Society Conference on Computer Vision and Pattern Recognition. Proceedings, XP055541800, Jun. 1, 2015, pp. 1110-1118.

* cited by examiner

DETECTION SYSTEM AND DETECTION METHOD FOR USING A NEURAL NETWORK TO DETECT A PROFICIENCY OF A WORKER

CROSS-REFERENCE TO RELATED APPLICATIONS

This application is based upon and claims the benefit of priority from Japanese Patent Application No. 2017-162301, filed on Aug. 25, 2017; the entire contents of which are incorporated herein by reference.

FIELD

Embodiments described herein relate generally to a detection system and a detection method.

BACKGROUND

In a general manufacturing site, much of the work is performed by humans. For example, in a general manufacturing line, multiple workers sequentially perform work on one source material or intermediate product to complete one component or product. If the knowledge of the worker and/or the education of the worker is insufficient, the worker spends much time on the assigned work. As a result, the efficiency of the manufacturing line including the worker decreases.

To suppress the efficiency decrease of the manufacturing line due to such an inexperienced worker, several approaches are taken. For example, another human observes the worker; and an improvement is made by pointing out an action when an action needing improvement is discovered. However, in such a case, the observer must observe the entire work of each of the workers; and much time is necessary. Also, fluctuation occurs because the extraction of the action needing improvement is dependent on the subjectivity, the experience, and the skill of the observer.

Therefore, it is desirable to develop a system capable of automatically and objectively detecting the action of the worker needing improvement.

DETAILED DESCRIPTION

Figure 1:
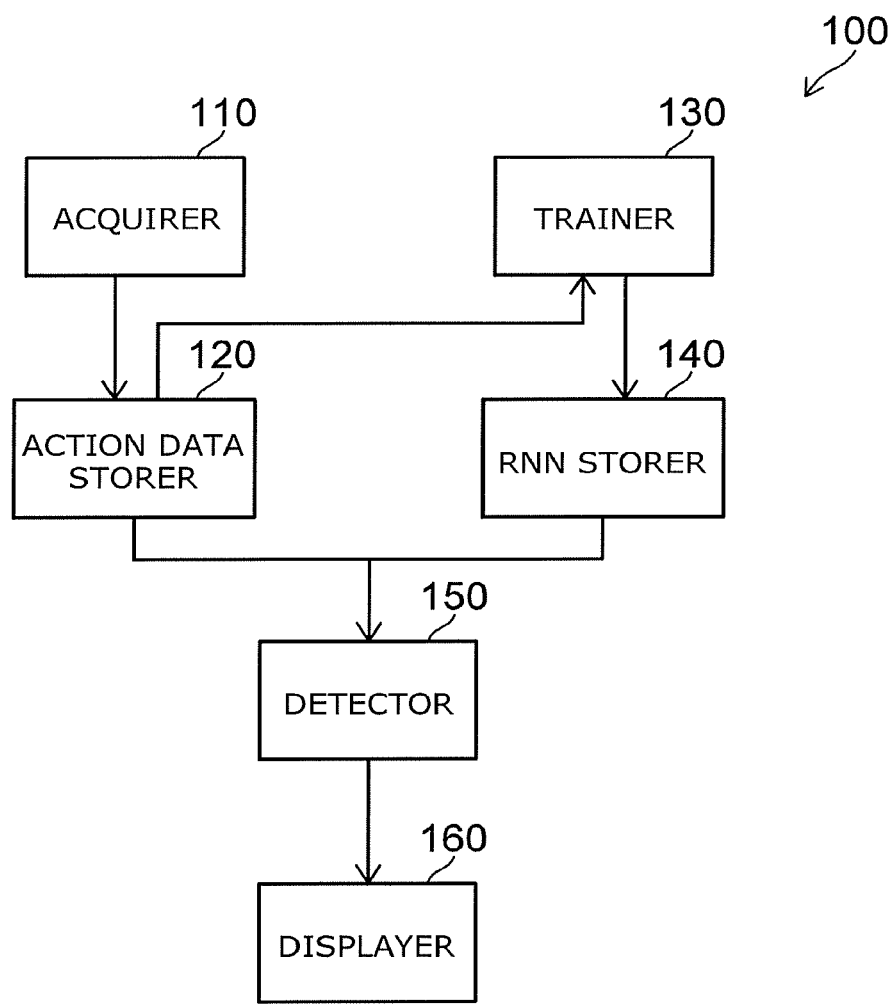
FIG. 1 is a block diagram illustrating the configuration of a detection system according to a first embodiment.

According to one embodiment, a detection system includes an acquirer, a trainer, and a detector. The acquirer acquires first data of a time series, second data of a time series, and third data of a time series. The first data is based on an action of a first body part in a first work of a first worker having a first proficiency. The second data is based on an action of the first body part in the first work of a second worker having a second proficiency. The third data is based on an action of the first body part in the first work of a third worker. The trainer trains a recurrent neural network including a first output layer. The first output layer includes a first neuron and a second neuron. The trainer trains the recurrent neural network by setting a first value as teacher data in the first neuron and by inputting the first data to the recurrent neural network. The first value corresponds to the action of the first body part of the first proficiency. The trainer trains the recurrent neural network by setting a second value as teacher data in the second neuron and by inputting the second data to the recurrent neural network. The second value corresponds to the action of the first body part of the second proficiency. The detector inputs the third data to the trained recurrent neural network and detects a response of the first neuron or the second neuron.

Embodiments of the invention will now be described with reference to the drawings.

In the drawings and the specification of the application, components similar to those described thereinabove are marked with like reference numerals, and a detailed description is omitted as appropriate.

First Embodiment

FIG. 1 is a block diagram illustrating the configuration of a detection system according to a first embodiment.

Figure 2:
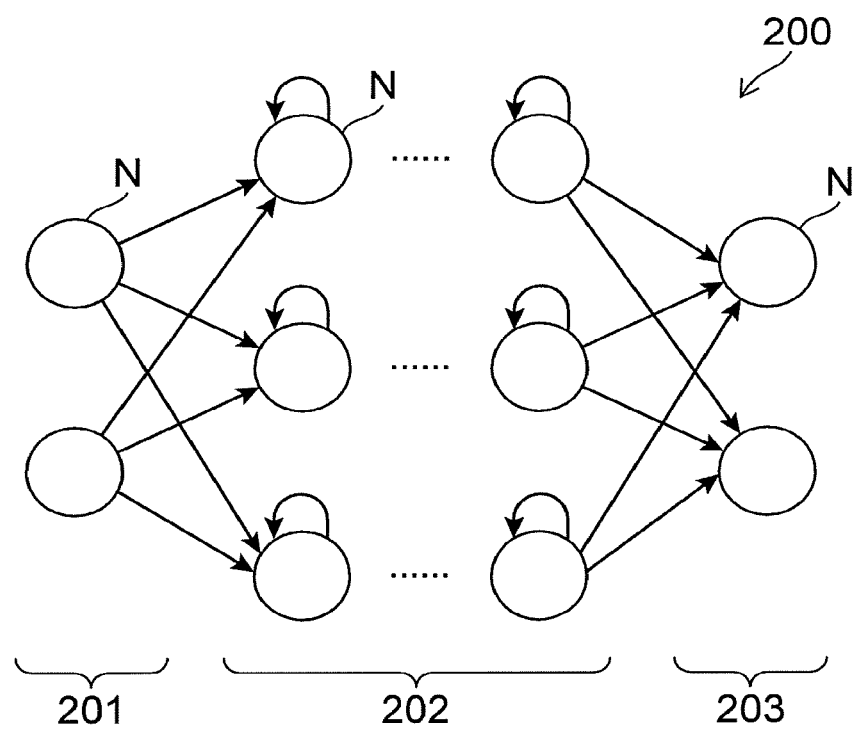
FIG. 2 is a schematic view illustrating a schematic configuration of a neural network used in the first embodiment.

FIG. 2 is a schematic view illustrating a schematic configuration of a neural network used in the first embodiment.

As illustrated in FIG. 1, the detection system 100 includes an acquirer 110, an action data storer 120, a trainer 130, a recurrent neural network storer (hereinbelow, called an RNN storer) 140, a detector 150, and a displayer 160.

The acquirer 110 acquires time series data based on an action of a worker.

For example, the acquirer 110 includes an imaging device. The acquirer 110 uses the imaging device to image the worker performing work. The acquirer 110 extracts skeletal information of the worker from the image that is imaged. The acquirer 110 acquires, as time series data based on the action of the worker, the change of the position of a part of the skeleton (e.g., the head) as time elapses.

Or, the acquirer 110 may extract the angle of a joint from the skeletal information. In such a case, the acquirer 110 acquires, as the time series data based on the action of the worker, the change of the angle of the joint (e.g., the angle of an elbow) as time elapses.

Or, the acquirer 110 may include an accelerometer. The accelerometer is mounted to a part of the body such as an arm, a leg, etc., of the worker. The acquirer 110 acquires, as the time series data based on the action of the worker, acceleration information obtained when the worker performs the work.

The acquirer 110 acquires time series data based on actions of multiple workers. The actions of the workers are acquired by the same method. As an example, the acquirer 110 acquires time series data based on the action for each of a first worker, a second worker, and a third worker.

For example, the acquirer 110 acquires the time series data based on the action of the first worker by imaging the first worker from above and by extracting the skeletal information. In such a case, the acquirer 110 similarly images the second worker and the third worker from above and extracts the skeletal information. Thereby, the time series data based on the action of the second worker and the time series data based on the action of the third worker are acquired.

Or, for example, the acquirer 110 acquires the time series data based on the action of the first worker by using an accelerometer mounted to the right forearm of the first worker. In such a case, the acquirer 110 similarly acquires the time series data based on the action of the second worker and the time series data based on the action of the third worker by using accelerometers mounted respectively to the right forearm of the second worker and the right forearm of the third worker.

The time series data that is acquired by the acquirer 110 is stored in the action data storer 120.

The trainer 130 uses the time series data stored in the action data storer 120 to train a recurrent neural network (hereinbelow, called an RNN) stored in the RNN storer 140. The RNN is one type of neural network. The neural network copies a biological recognition system by using multiple artificial neurons (nodes). The multiple neurons are connected to each other by artificial synapses (connecting lines) set with weighting.

As illustrated in FIG. 2, an RNN 200 includes an input layer 201, an intermediate layer 202, and an output layer 203. In the RNN, the outputs of neurons N of the intermediate layer 202 in one time division are connected to the inputs of the neurons N of the intermediate layer 202 in a subsequent time division.

The trainer 130 inputs the time series data for training to the neurons N included in the input layer 201. Also, the trainer 130 inputs teacher data to the neurons N included in the output layer 203. Thereby, the weighting of the synapses included in the RNN changes to reduce the difference between the teacher data and the time series data that is the input.

The trainer 130 stores the trained RNN in the RNN storer 140.

The detector 150 inputs, to the RNN stored in the RNN storer 140, other time series data stored in the action data storer 120. The neurons N of the output layer 203 may respond when the time series data is input to the input layer 201 of the RNN. The detector 150 detects the response of the neurons N. For example, the detector 150 compares the activity of the neurons N to a prescribed threshold. In the case where the activity of the neuron N is higher than the prescribed threshold, the detector 150 detects that the neuron N responded. The detector 150 may extract the data of the time series data for the interval when the neuron N responded. Or, the detector 150 may extract data of the activity of the neuron N and a part of the time series data for the interval.

The displayer 160 displays the detection result of the detector 150. For example, the displayer 160 displays a part of the time series data extracted by the detector 150 so that the part is discriminable from another part of the time series data. In the case where the detector 150 does not detect a response of the neurons N, the displayer 160 may display such a result.

For example, the neurons N of the intermediate layer 202 of the RNN have an LSTM (Long Short Term Memory) structure. Compared to a neural network having another structure, the recognition rate of time series data for a longer period of work can be increased using a neural network having an LSTM structure.

Figure 3:
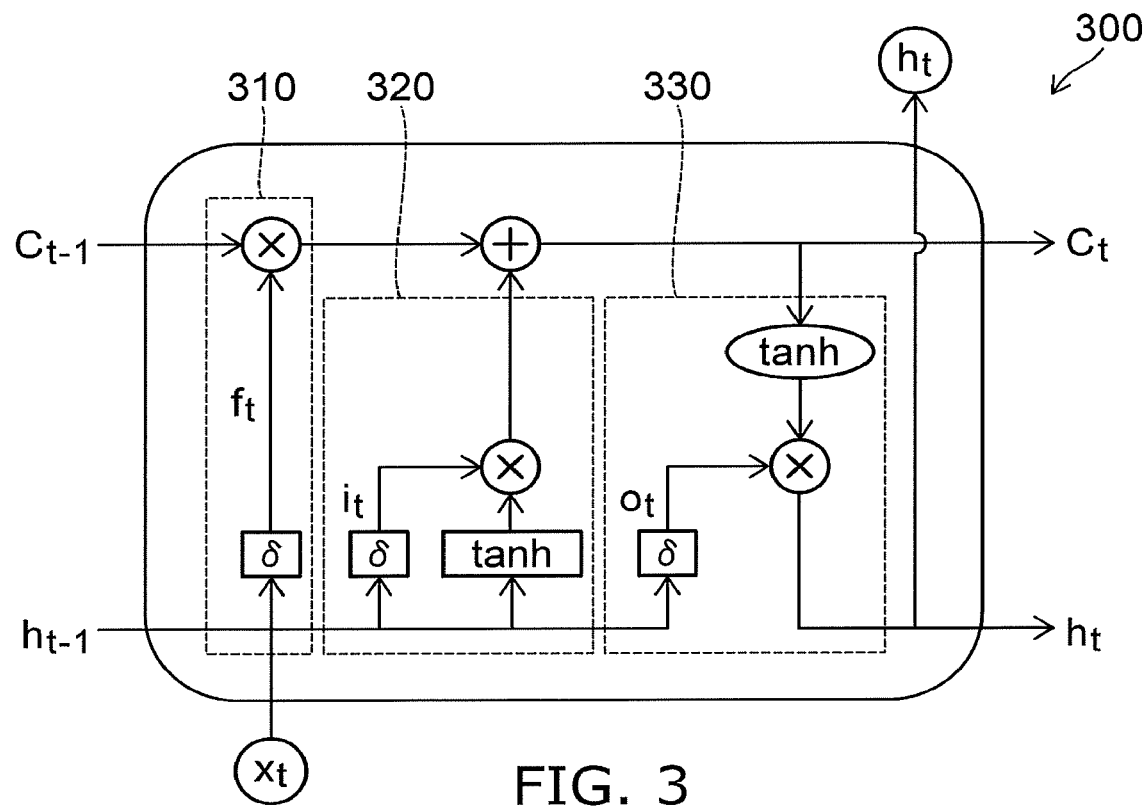
FIG. 3 is a block diagram illustrating an LSTM structure.

FIG. 3 is a block diagram illustrating an LSTM structure.

As illustrated in FIG. 3, the LSTM structure 300 includes a forget gate 310, an input gate 320, and an output gate 330.

In FIG. 3, $x_t$ is the input value to the neurons N at a time t. $C_t$ is the state of the neurons N at the time t. $f_t$ is the output value of the forget gate 310 at the time t. $i_t$ is the output value of the input gate at the time t. $o_t$ is the output value of the output gate at the time t. $h_t$ is the output value of the neurons N at the time t. $f_t$, $i_t$, $C_t$, $o_t$, and $h_t$ are represented respectively by "Formula 1" to "Formula 5" recited below.

$$f_t = \sigma(W_f \cdot [h_{t-1}, x_t] + b_f) \qquad \text{[Formula 1]}$$

$$i_t = \sigma(W_i \cdot [h_{t-1}, x_t] + b_i) \qquad \text{[Formula 2]}$$

$$C_t = f_t * C_{t-1} + i_t * \tanh(W_C \cdot [h_{t-1}, x_t] + b_C) \qquad \text{[Formula 3]}$$

$$o_t = \sigma(W_o \cdot [h_{t-1}, x_t] + b_o) \qquad \text{[Formula 4]}$$

$$h_t = o_t * \tanh(C_t) \qquad \text{[Formula 5]}$$

The example illustrated in FIG. 3 is not limited thereto; and the neurons N of the intermediate layer 202 of the RNN may have a Gated Recurrent Unit structure, a bi-directional LSTM structure, etc.

The detection method and the operations of the detection system according to the first embodiment will now be described with reference to FIG. 4.

Figure 4:
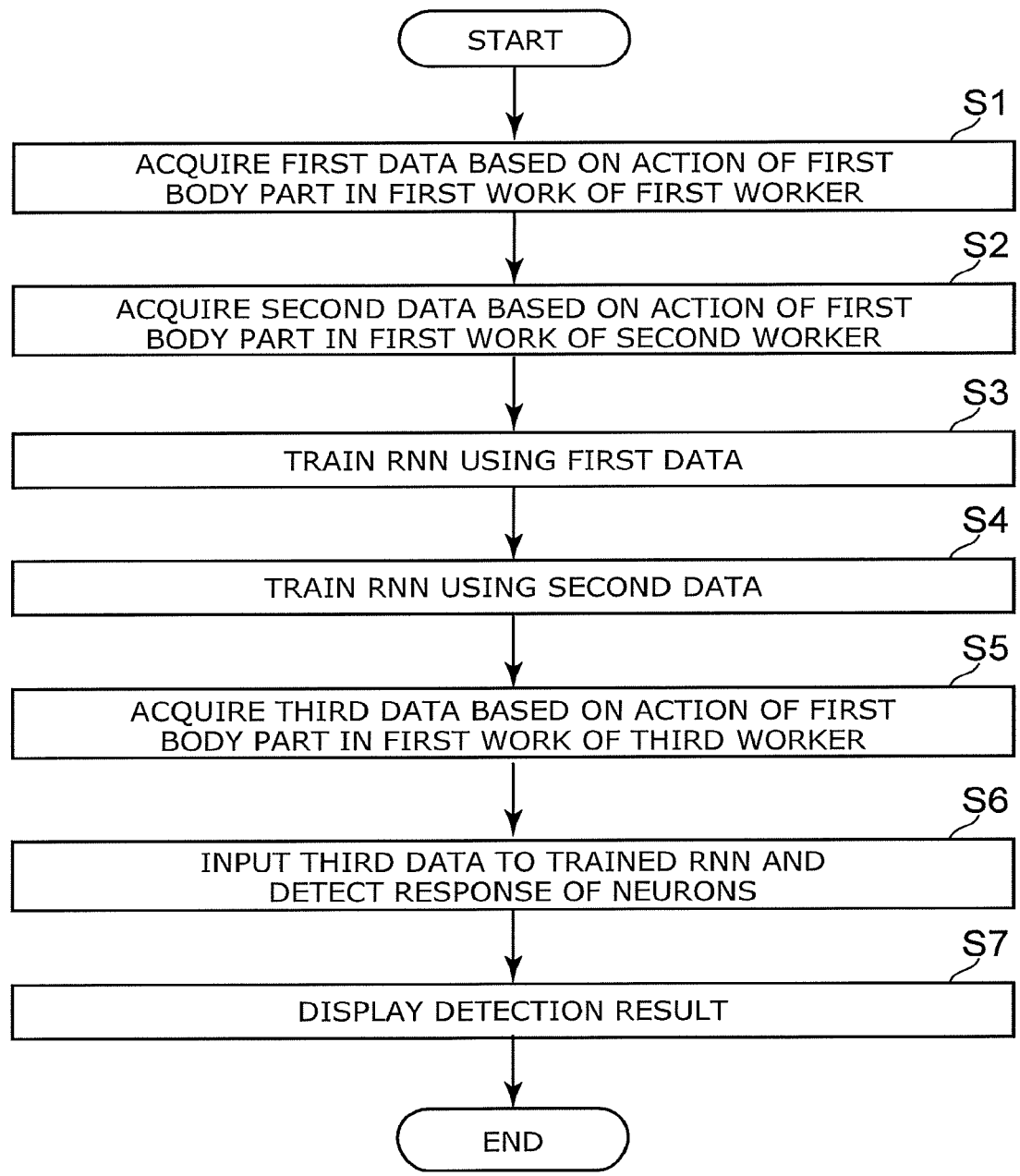
FIG. 4 is a flowchart illustrating the operations of the detection system according to the first embodiment.

FIG. 4 is a flowchart illustrating the operations of the detection system according to the first embodiment.

The acquirer 110 acquires first data based on the action of a first body part in first work of the first worker (step S1). The first worker has a first proficiency. The first worker needs a first time for the first work. Therefore, in step S1, time series data that has the length of the first time is acquired as the first data.

The acquirer 110 acquires second data based on the action of the first body part in the first work of the second worker (step S2). The second worker has a second proficiency that is different from the first proficiency. The second worker needs a second time for the first work. Therefore, in step S2, time series data that has the length of the second time is acquired as the second data. For example, the second time is different from the first time.

By steps S1 and S2, multiple data is obtained when workers having different proficiencies perform the same work. The acquirer 110 stores the first data and the second data in the action data storer 120.

The trainer 130 trains the RNN by inputting the first data to the RNN of the RNN storer 140 (step S3). In step S3, a first value that corresponds to the action of the first proficiency is set as teacher data in a first neuron of the RNN; and the first data is input to the RNN. The trained RNN is stored in the RNN storer 140.

The trainer 130 trains the RNN by inputting the second data to the RNN of the RNN storer 140 (step S4). In step S4, a second value that corresponds to the action of the second proficiency is set as teacher data in a second neuron of the RNN; and the second data is input to the RNN. The trained RNN is stored in the RNN storer 140.

The RNN that is trained in steps S3 and S4 has the following characteristics.

The activity of the first neuron becomes high when the data based on the action corresponding to the first proficiency is input to the RNN. The activity of the second neuron becomes high when the data based on the action corresponding to the second proficiency is input to the RNN.

The acquirer 110 acquires third data based on the action of the first body part in the first work of the third worker (step S5). The third worker is the object for which the analysis of the work is performed. The third worker needs a third time for the first work. Therefore, in step S5, time series data that has the length of the third time is acquired as the third data. For example, the third time is different from each of the first time and the second time. The acquirer 110 stores the third data in the action data storer 120.

The detector 150 inputs the third data to the trained RNN (step S6). While the third data of the time series is input, the detector 150 compares the activities of the first neuron and the second neuron to the prescribed threshold. In the case where the activity of either neuron exceeds the threshold, the detector 150 detects that the neuron is responding. A response of the first neuron or the second neuron means that the action of at least a part of the third data corresponds to the first proficiency or the second proficiency. For example, the detector 150 extracts the at least a part of the third data for which the first neuron or the second neuron responded.

The displayer 160 displays the detection result of the detector 150 (step S7). For example, the displayer 160 displays the neuron that responded. In the case where the detector 150 extracts the part of the third data for which the first neuron or the second neuron responded, the displayer 160 may display the part of the third data. The displayer 160 may display the entire third data and may display the extracted part of the third data to be discriminable from the other parts.

The order of step S1 is modifiable as appropriate as long as step S1 is before step S3. The order of step S2 is modifiable as appropriate as long as step S2 is before step S4. The order of step S5 is modifiable as appropriate as long as step S5 is before step S6. At least two of steps S1, S2, or S5 may be performed simultaneously.

In the example, supervised learning of the RNN is performed using the data of two workers having different proficiencies. The supervised learning of the RNN may be performed using the data of three or more workers. In such a case, three or more values corresponding respectively to three or more proficiencies are set respectively to the multiple neurons N of the output layer 203 in the RNN. Thereby, the action at each point in time of the third worker can be classified more finely according to the proficiency.

Effects of the embodiment will now be described.

According to the detection method and the detection system 100 according to the embodiment, it can be detected whether or not an aspect needing improvement is included in the action when performing the prescribed work. As an example, the first worker can complete the first work quickly. The second worker needs more time for the first work. When the third worker performs the first work, one part of the action is quick; but one other part of the action is slow. For example, in such a case, according to the detection method and the detection system 100 according to the embodiment, the following results are obtained. While the time series data based on the one part of the action of the third worker recited above is input to the RNN, the first neuron that corresponds to the first proficiency responds. While the time series data based on the one other part of the action of the third worker recited above is input to the RNN, the second neuron that corresponds to the second proficiency responds. The detector 150 detects the responses of these neurons. As a result, the user of the detection system 100 or the performer of the analysis method can see that the action of the third worker includes the part in which the work is quick and the part in which the work is slow.

Conventionally, the existence or absence of an aspect of the action needing improvement has been confirmed by, for example, an observation by a human. In such a case, the observer must observe the entire work of each of the workers; and much time is necessary. Also, fluctuation occurs because the extraction of an aspect needing improvement is dependent on the subjectivity, the experience, and the proficiency of the observer.

On the other hand, in the detection method and the detection system according to the embodiment, the aspect needing improvement is detected based on the RNN. The RNN is trained using data based on the actions of other workers. Accordingly, the aspect needing improvement is detected objectively and is independent of the experience of the observer, etc. Further, the observer is unnecessary because the aspect needing improvement is detected automatically by the detection method and the detection system according to the embodiment. Thus, according to the embodiment, a detection system and a detection method are provided in which the action of the worker needing improvement can be detected automatically and objectively.

Here, the case is described where the object is to detect the action of the worker needing improvement. The applications of the detection method and the detection system 100 according to the embodiment are not limited to the examples. For example, it is also possible to use the detection method and the detection system 100 according to the embodiment to detect a superior action of the worker.

In the embodiment, the analysis of the work is performed using the RNN. By using the RNN, the following effects are obtained.

The work period is different between workers. Accordingly, even if each of the workers starts the work at the same time, as time elapses, fluctuation occurs between what work is being performed by each worker at some point in time. For this aspect, by using the RNN, the effects of such fluctuation of the work period can be eliminated; and the action needing improvement in the work can be detected. By using the recurrent neural network, the relationship between the action at some time division and the action at a subsequent time division can be considered. As a result, not only the action causing an increase of the work time but also the actions that are linked to such an action and cause such an action can be detected.

Further, in the detection method and the detection system according to the embodiment, it is desirable for the neurons N of the intermediate layer 202 of the RNN 200 to have the LSTM structure illustrated in FIG. 3. By applying the LSTM structure, the state of the neurons N included in the intermediate layer 202 can be stored over a longer interval. The mutual dependency of the actions at each point in time can be analyzed over a longer interval. Accordingly, any neuron that is included in the output layer 203 may respond not only for the action at some point in time but also for the actions linked to such an action before and after. As a result, the action of the worker needing improvement can be detected more comprehensively.

Also, the time series data based on the action of each worker is acquirable by various methods. Acceleration information, skeletal information, etc., can be utilized as the data based on the action. In particular, the angle of a joint can be used favorably as the data.

This is because the angles of the joints are not very dependent on the physique. Accordingly, by using an angle of a joint as the data, the effects of the difference between physiques on the data can be reduced. The precision of the detection can be increased.

Further, for example, it is also possible for the detector 150 to input the time series data to the trained RNN; and in the case where a response occurs in a neuron corresponding to one of the proficiencies, the detector 150 can extract the part of the time series data for which the neuron responded. Thereby, the aspect needing improvement can be identified specifically.

FIRST EXAMPLE

Figure 5A:
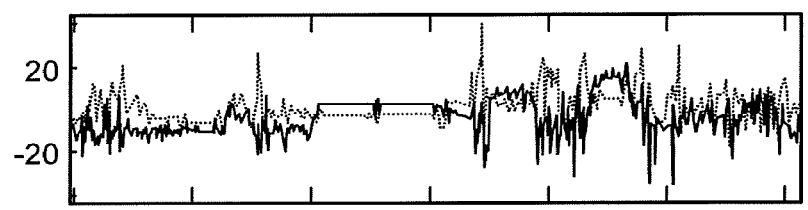
FIG. 5A and FIG. 5B are graphs illustrating data acquired in a first example.
Figure 5B:
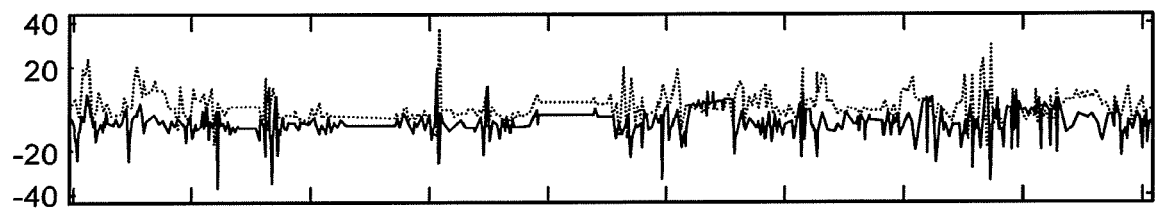

FIG. 5A and FIG. 5B are graphs illustrating data acquired in a first example.

Figure 6A:
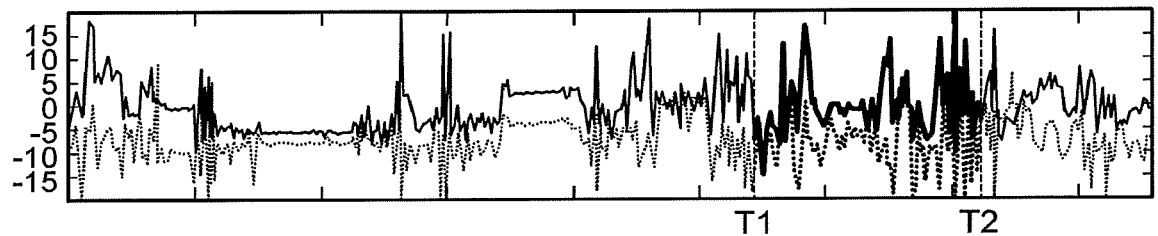
FIG. 6A is a graph illustrating data acquired in the first example and FIG. 6B and FIG. 6C are graphs illustrating the activity of a neuron of the first example.
Figure 6B:
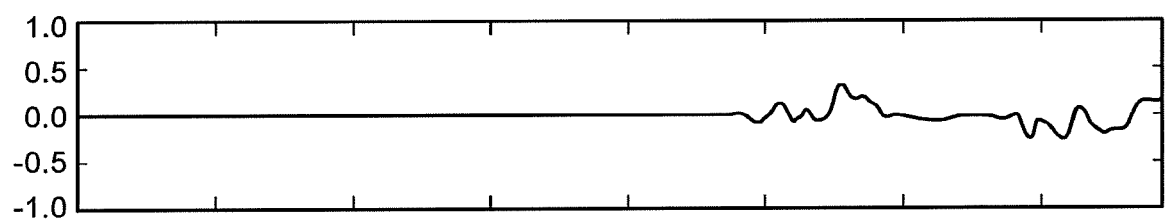
Figure 6C:
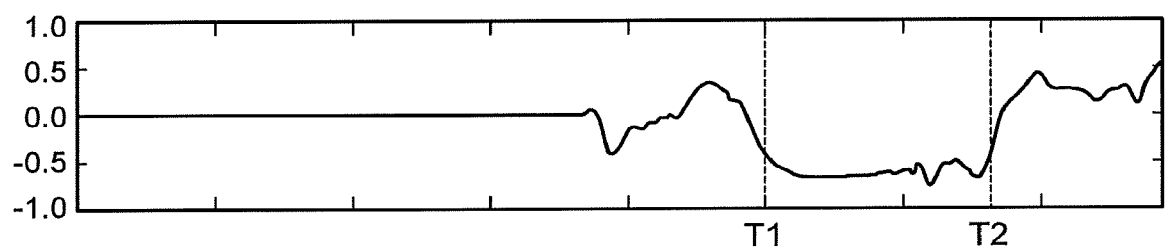

FIG. 6A is a graph illustrating data acquired in the first example. FIG. 6B and FIG. 6C are graphs illustrating the activity of a neuron of the first example.

The data illustrated in FIG. 5A, FIG. 5B, and FIG. 6A is respectively based on the actions when the first worker, the second worker, and the third worker performed the first work. The data of FIG. 5A, FIG. 5B, and FIG. 6A was acquired by mounting an accelerometer to the right wrist of each of the first worker, the second worker, and the third worker.

In FIG. 5A, FIG. 5B, and FIG. 6A, the horizontal axis is the time; and the vertical axis is the acceleration. The solid line and the dotted line respectively illustrate the acceleration in an X-axis direction and the acceleration in a Y-axis direction.

The acquirer 110 acquired the data illustrated in FIG. 5A and FIG. 5B and stored the data in the action data storer 120. The trainer 130 referred to the data illustrated in FIG. 5A and FIG. 5B and trained the RNN stored in the RNN storer 140. From the comparison of FIG. 5A and FIG. 5B, it can be seen that the time needed by the first worker in the first work is shorter than the time needed by the second worker in the first work. In other words, the proficiency of the first worker is superior to the proficiency of the second worker.

The detector 150 inputs the data illustrated in FIG. 6A to the trained RNN stored in the RNN storer 140. FIG. 6B and FIG. 6C are graphs respectively illustrating the activities of the first neuron and the second neuron when the data illustrated in FIG. 6A is input. In the case where the activity of the first neuron is high, this shows that the action that corresponds to the input data corresponds to the first proficiency of the first worker. In the case where the activity of the second neuron is high, this shows that the action that corresponds to the input data corresponds to the second proficiency of the second worker. In FIG. 6B and FIG. 6C, the horizontal axis is the time; and the vertical axis is the activity of the neuron. A larger absolute value of the activity of the neuron shows that the neuron responds strongly.

From FIG. 6B and FIG. 6C, it can be seen that the activity of the second neuron is large between a time T1 to a time T2. In other words, this shows that the action between the time T1 and the time T2 of the third worker corresponds to the second proficiency of the second worker. For example, between the time T1 and the time T2, the activity of the second neuron exceeds the threshold. The detector 150 detects that the second neuron is responding. For example, as illustrated in FIG. 6A, the displayer 160 displays the data of the third worker of the time T1 to the time T2 to be discriminable from the other parts. From the results of the example, it can be seen that the action for which the response of the second neuron is detected should be improved.

The display method of the displayer 160 is modifiable as appropriate. For example, the displayer 160 may change the color of the data at each point in time illustrated in FIG. 6A according to the activity of the neuron. For example, the color may be changed continuously from red to blue as the activity of the neuron increases.

Or, in the case where the acquirer 110 acquires the data based on the action by imaging each of the workers, the displayer 160 may display the action of the third worker as an animation. For example, the displayer 160 displays the action for which the neuron responded to be discriminable from the others by coloring, etc.

SECOND EXAMPLE

Figure 7A:
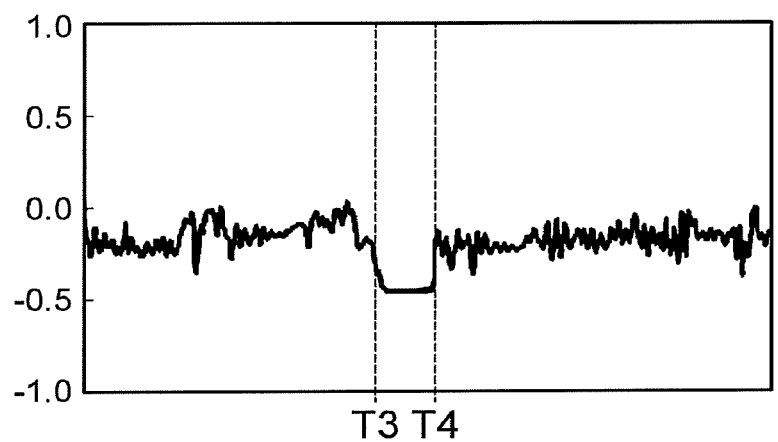
FIG. 7A is a graph illustrating the activity of a neuron of a second example and FIG. 7B is a schematic view illustrating the screen displayed by a displayer.
Figure 7B:
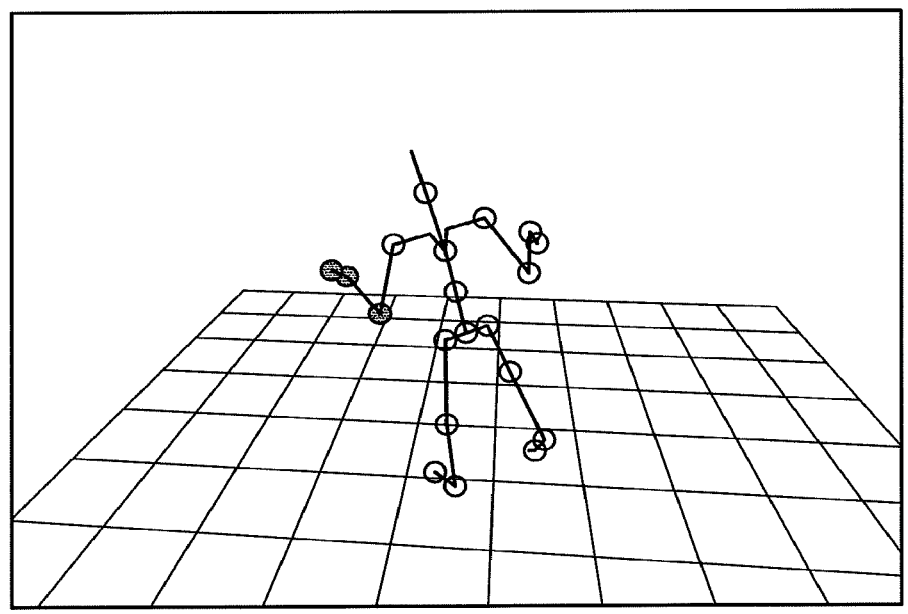

FIG. 7A is a graph illustrating the activity of a neuron of a second example. FIG. 7B is a schematic view illustrating the screen displayed by a displayer.

In the example, the acquirer 110 imaged the first to third workers and extracted the skeletal information of each worker. In the example, the RNN is trained using time series data based on the movement of the skeletons of the first to third workers.

In the example illustrated in FIG. 7A, when the time series data relating to the third worker was input to the RNN, the activity of the second neuron was high between a time T3 and a time T4; and the detector 150 detected a response of the second neuron. This shows that the action of the third worker between the time T3 and the time T4 corresponds to the second proficiency. At this time, for example, the detector 150 extracts the time series data of the skeletal information between the time T3 and the time T4. Then, the displayer 160 displays the extracted time series data of the skeletal information. From the results of the example, it can be seen that the action for which the response of the second neuron is detected should be improved.

The skeletal information of the third worker is illustrated in FIG. 7B. In FIG. 7B, the parts illustrated by white circles are joints. In the example, the aspect needing improvement was detected using the time series data based on the action of the right arm. For example, the displayer 160 shows the joints of the right arm in gray as illustrated in FIG. 7B and displays the joints of the right arm to be discriminable from the other body parts. Thereby, the user of the detection system 100 can understand easily and in a shorter time the time period and the part of the third worker for which the action should be improved.

Second Embodiment

Figure 8:
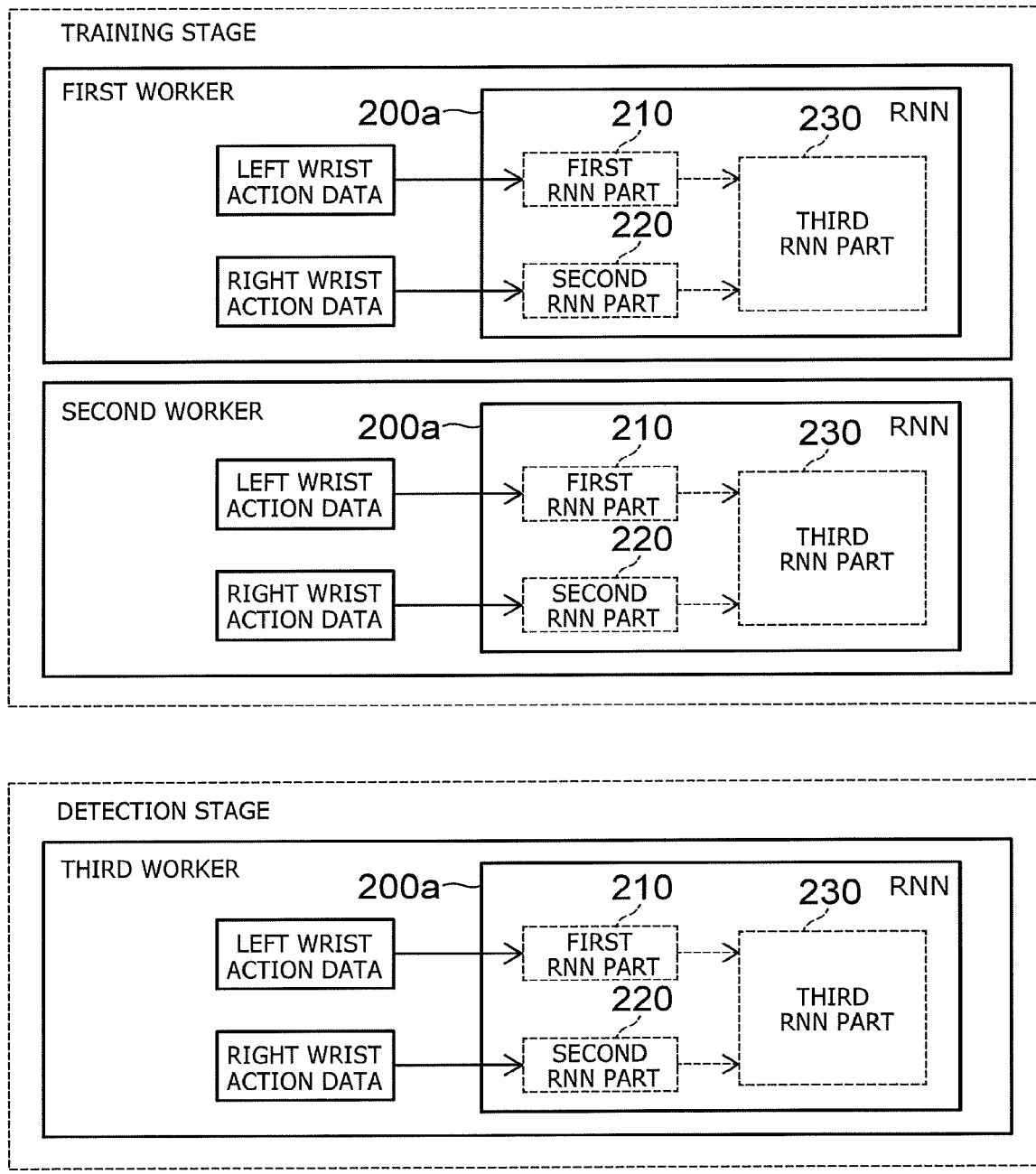
FIG. 8 is a conceptual view illustrating operations of a detection system according to a second embodiment.

FIG. 8 is a conceptual view illustrating operations of a detection system according to a second embodiment.

Figure 9:
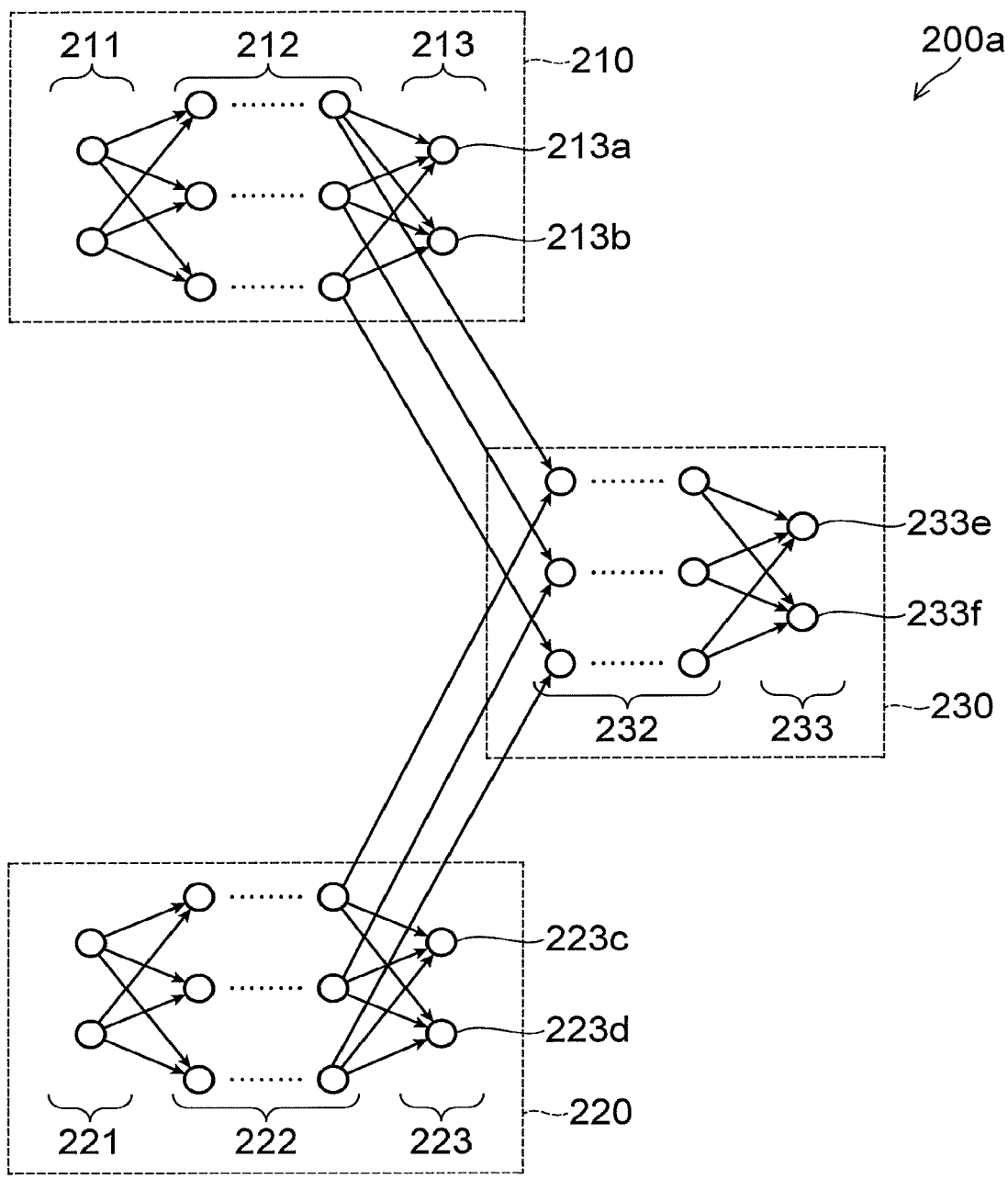
FIG. 9 is a schematic view illustrating a schematic configuration of the neural network used in the second embodiment.

FIG. 9 is a schematic view illustrating a schematic configuration of the neural network used in the second embodiment.

An example is described in the first embodiment in which data based on the action of one part of each worker is used. The detection system according to the embodiment may use data based on actions of multiple parts.

At the training stage of the RNN as illustrated in FIG. 8, the acquirer 110 acquires time series data based on actions of multiple parts of the first worker and the second worker. Similarly to the first embodiment, the first worker has the first proficiency; and the second worker has the second proficiency that is worse than the first proficiency. For example, the acquirer 110 acquires time series data based on the action of the left wrist of the first worker in the first work, time series data based on the action of the right wrist of the first worker in the first work, time series data based on the action of the left wrist of the second worker in the first work, and time series data based on the action of the right wrist of the second worker in the first work.

As illustrated in FIG. 8 and FIG. 9, an RNN 200a of the detection system according to the second embodiment includes a first RNN part 210, a second RNN part 220, and a third RNN part 230. The first RNN part 210 is for detecting whether there is an aspect needing improvement in the action of the left wrist. The second RNN part 220 is for detecting whether there is an aspect needing improvement in the action of the right wrist. The third RNN part 230 is for detecting whether there is an aspect needing improvement in the action in which the left wrist and the right wrist are combined.

As illustrated in FIG. 9, the first RNN part 210 includes a first input layer 211, a first intermediate layer 212, and a first output layer 213. The second RNN part 220 includes a second input layer 221, a second intermediate layer 222, and a second output layer 223. The third RNN part 230 includes a third intermediate layer 232 and a third output layer 233. The outputs of the first RNN part 210 and the second RNN part 220 are input to the third intermediate layer 232 of the third RNN part 230.

The first output layer 213 of the first RNN part 210 includes a first neuron 213a and a second neuron 213b. The second output layer 223 of the second RNN part 220 include a third neuron 223c and a fourth neuron 223d. The third output layer 233 of the third RNN part 230 includes a fifth neuron 233e and a sixth neuron 233f.

The trainer 130 trains the first RNN part 210 by using the time series data (the first data) based on the action of the left wrist of the first worker and the time series data (the second data) based on the action of the left wrist of the second worker. Specifically, the trainer 130 sets, in the first neuron 213a, the first value corresponding to the action of the left wrist of the first proficiency and inputs, to the first input layer 211, the time series data based on the action of the left wrist of the first worker. The trainer 130 sets, in the second neuron 213b, the second value corresponding to the action of the left wrist of the second proficiency and inputs, to the first input layer 211, the time series data based on the action of the left wrist of the second worker. By this training, the weighting of the synapses included in the first intermediate layer 212 of the first RNN part 210 changes.

The trainer 130 trains the second RNN part 220 by using time series data (fourth data) based on the action of the right wrist of the first worker and time series data (fifth data) based on the action of the right wrist of the second worker. Specifically, the trainer 130 sets, in the third neuron 223c, the third value corresponding to the action of the right wrist of the first proficiency and inputs, to the second input layer 221, the time series data based on the action of the right wrist of the first worker. The trainer 130 sets, in the fourth neuron 223d, a fourth value corresponding to the action of the right wrist of the second proficiency and inputs, to the second input layer 221, the time series data based on the action of the right wrist of the second worker. By this training, the weighting of the synapses included in the second intermediate layer 222 of the second RNN part 220 changes.

Further, the trainer 130 trains the third RNN part 230 by using these four time series data. Specifically, the trainer 130 sets, in the fifth neuron 233e, a fifth value corresponding to the action of the combination of the left wrist and the right wrist of the first proficiency and inputs, respectively to the first input layer 211 and the second input layer 221, the time series data based on the action of the left wrist of the first worker and the time series data based on the action of the right wrist of the first worker. The trainer 130 sets, in the sixth neuron 233f, a sixth value corresponding to the action of the combination of the left wrist and the right wrist of the second proficiency and inputs, respectively to the first input layer 211 and the second input layer 221, the time series data based on the action of the left wrist of the second worker and the time series data based on the action of the right wrist of the second worker. In these training processes, the weighting of the synapses included in the first RNN part 210 and the second RNN part 220 is fixed and does not change. Thereby, the weighting of the synapses included in the third intermediate layer 232 of the third RNN part 230 changes.

At the detection stage of the RNN, the acquirer 110 acquires the time series data (the third data) based on the action of the left wrist of the third worker and time series data (sixth data) based on the action of the right wrist of the third worker. The detector 150 inputs, to the first RNN part 210, the time series data based on the action of the left wrist of the third worker and inputs, to the second RNN part 220, the time series data based on the action of the right wrist of the third worker. The signals that are output from the first RNN part 210 and the second RNN part 220 are input to the third RNN part 230.

The detector 150 detects the responses of the first to sixth neurons 213a to 233f of the RNN. As a result, it is detected that there is no aspect needing improvement in any of the action of the left wrist, the action of the right wrist, or the action of the combination of the left wrist and the right wrist for the third worker.

Figure 10:
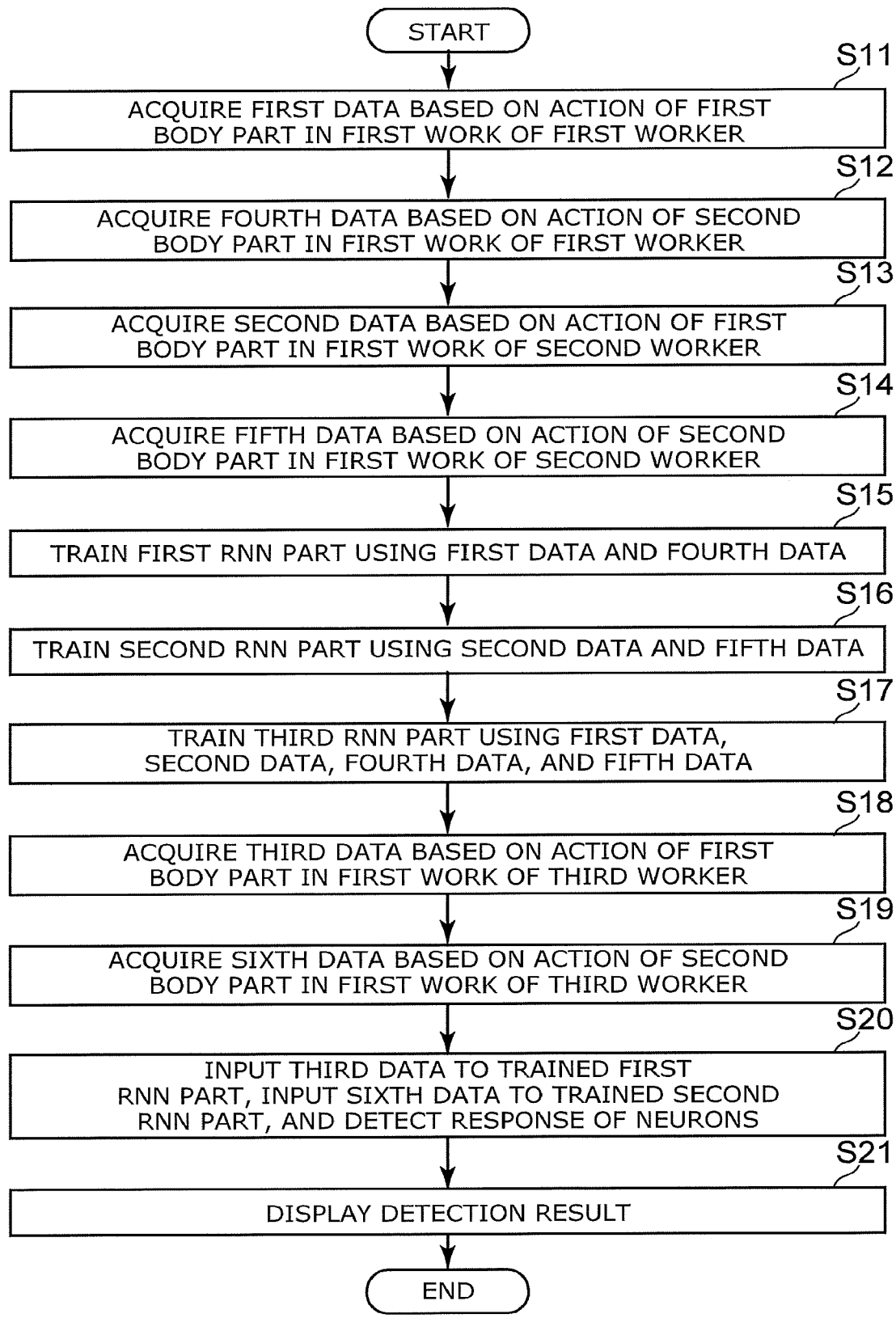
FIG. 10 is a flowchart illustrating the operations of the detection system according to the second embodiment.

FIG. 10 is a flowchart illustrating the operations of the detection system according to the second embodiment.

The acquirer 110 acquires the first data based on the action of the first body part (e.g., the left wrist) in the first work of the first worker (step S11). The acquirer 110 acquires the fourth data based on the action of a second body part (e.g., the right wrist) in the first work of the first worker (step S12). The first data and the fourth data are, for example, time series data having the length of the first time.

The acquirer 110 acquires the second data based on the action of the first body part in the first work of the second worker (step S13). The acquirer 110 acquires the fifth data based on the action of the second body part in the first work of the second worker (step S14). The second data and the fifth data are, for example, time series data having the length of the second time. The first data, the second data, the fourth data, and the fifth data are stored in the action data storer 120.

The trainer 130 trains the first RNN part 210 by inputting the first data and the fourth data to the first RNN part 210 (step S15). The trainer 130 trains the second RNN part 220 by inputting the second data and the fifth data to the second RNN part 220 (step S16). The trainer 130 trains the third RNN part 230 by inputting the first data, the second data, the fourth data, and the fifth data to the first RNN part 210 and the second RNN part 220 (step S17). The training in steps S15 to S17 is as described with reference to FIG. 9.

The acquirer 110 acquires the third data based on the action of the first body part in the first work of the third worker (step S18). The acquirer 110 acquires the sixth data based on the action of the second body part in the first work of the third worker (step S19). The third data and the sixth data are, for example, time series data having lengths of the third time.

The detector 150 inputs the third data to the trained first RNN part 210 and inputs the sixth data to the trained second RNN part 220 (step S20).

In step S20, the detector 150 detects the responses of the first to sixth neurons. A response of any of the neurons means that the action of the third worker corresponds to the first proficiency or the second proficiency.

The displayer 160 displays the detection result of the detector 150 (step S21).

The order of steps S11 and S13 is modifiable as appropriate as long as steps S11 and S13 are before step S15. The order of steps S12 and S14 is modifiable as appropriate as long as steps S12 and S14 are before step S16. The order of steps S18 and S19 is modifiable as appropriate as long as steps S18 and S19 are before step S20. Also, at least two of steps S11 to S14, S18, or S19 may be executed simultaneously. For example, steps S11 and S12 are executed simultaneously. Steps S13 and S14 are executed simultaneously. Steps S18 and S19 are executed simultaneously.

According to the detection system and the detection method illustrated in FIG. 8 to FIG. 10, the aspect needing improvement can be detected for the actions of each of the multiple body parts. According to the detection system, the aspect needing improvement can be detected also for the action of a combination of multiple body parts.

The detection of the aspect needing improvement for such an action of the combined multiple body parts can be used particularly favorably in the work of a manufacturing site. Generally, one unit of work is made of multiple continuous fine units of work. In the case of an expert, for example, when performing one fine unit of work, one body part is moved for that work while the multiple body parts as an entirety are moving for the next work.

According to the detection system illustrated in FIG. 8 to FIG. 10, the aspect needing improvement for the actions of each of the multiple body parts and the aspect needing improvement for the action of the combined multiple body parts can be detected. Therefore, a finer and more precise detection of the aspect needing improvement is possible; and further improvement of the manufacturing efficiency is possible.

In the detection method and the detection system according to the embodiment, only one of the detection of the aspect needing improvement for the action of each of the multiple body parts or the detection of the aspect needing improvement for the action of the combined multiple body parts may be performed. For more precise analysis of the action of the worker, it is desirable to perform the detection for both.

The first intermediate layer 212 of the first RNN part 210 and the second intermediate layer 222 of the second RNN part 220 are separated as illustrated in FIG. 9. The neurons of the first intermediate layer 212 and the neurons of the second intermediate layer 222 are not connected.

The inventors discovered the following. The first RNN part 210 and the second RNN part 220 are separated and trained individually. Further, the outputs of the RNN parts are input to the third RNN part 230. Thereby, the aspect needing improvement for the action of the combined multiple body parts can be detected with higher precision. In other words, the third RNN part 230 is trained by inputting the outputs of the first RNN part 210 and the second RNN part 220 to the third RNN part 230; and the action of the third worker is analyzed using the third RNN part 230. Thereby, the fifth neuron 233e or the sixth neuron 233f responds with better precision in the case where the combined action of the multiple body parts of the third worker corresponds to the first proficiency or the second proficiency.

Figure 11:
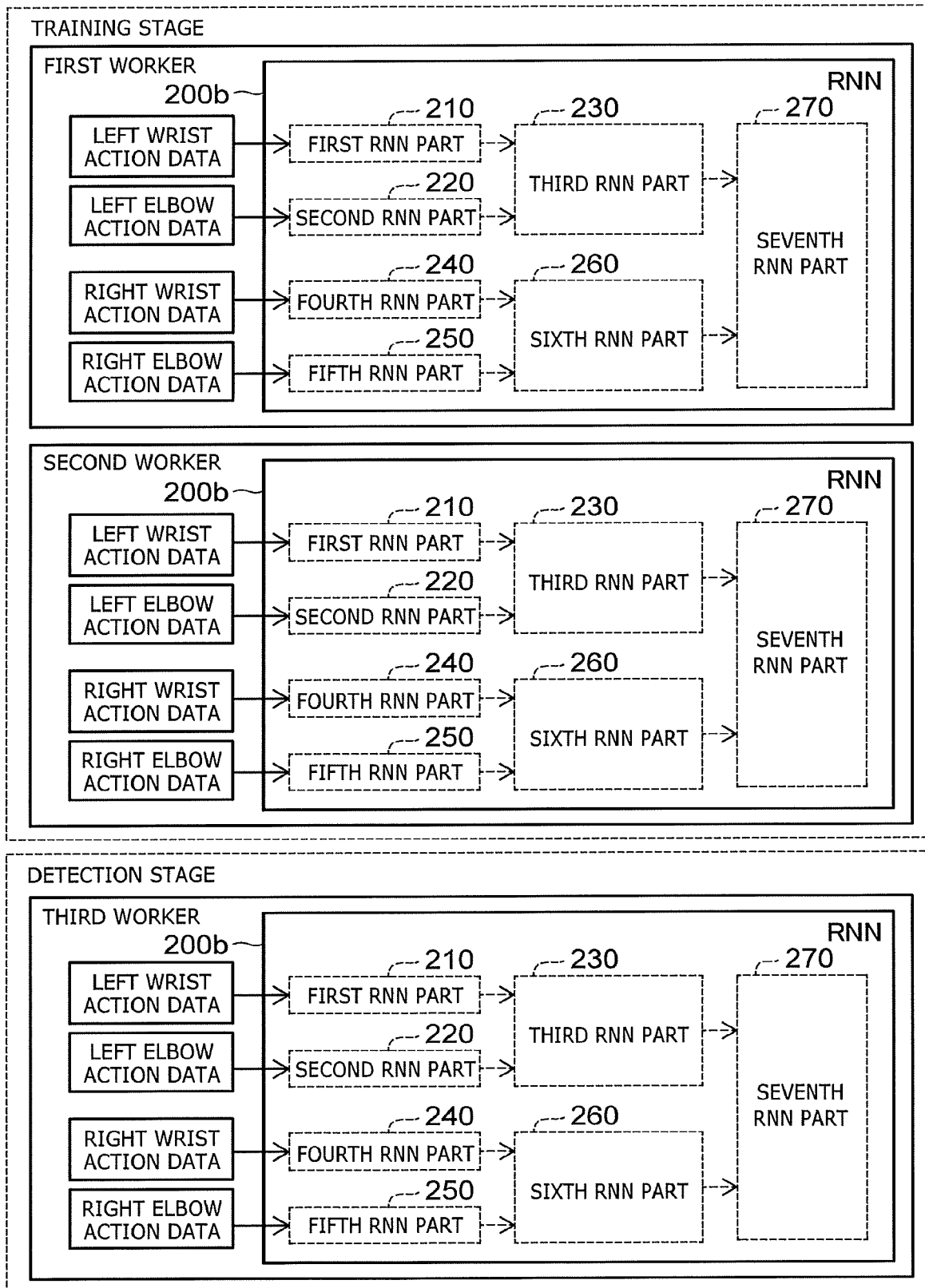
FIG. 11 is a conceptual view illustrating another operation of the detection system according to the second embodiment.

FIG. 11 is a conceptual view illustrating another operation of the detection system according to the second embodiment.

As illustrated in FIG. 11, the detection system according to the embodiment may detect the aspect needing improvement by using data based on the actions of more body parts.

In the example illustrated in FIG. 11, the acquirer 110 acquires time series data based on the actions of each of the left wrist, the left elbow, the right wrist, and the right elbow for each of the first to third workers.

An RNN 200b includes the first RNN part 210, the second RNN part 220, the third RNN part 230, a fourth RNN part 240, a fifth RNN part 250, a sixth RNN part 260, and a seventh RNN part 270.

The trainer 130 inputs the time series data of the left wrist, the time series data of the left elbow, the time series data of the right wrist, and the time series data of the right elbow for the first worker and the second worker respectively to the first RNN part 210, the second RNN part 220, the fourth RNN part 240, and the fifth RNN part 250. Thereby, the first RNN part 210, the second RNN part 220, the fourth RNN part 240, and the fifth RNN part 250 are trained. The trainer 130 inputs the outputs of the first RNN part 210 and the second RNN part 220 to the third RNN part 230 and inputs the outputs of the fourth RNN part 240 and the fifth RNN part 250 to the sixth RNN part 260. Thereby, the third RNN part 230 and the sixth RNN part 260 are trained. Further, the trainer 130 trains the seventh RNN part 270 by inputting the outputs of the third RNN part 230 and the sixth RNN part 260 to the seventh RNN part 270.

The detector 150 inputs the data of the left wrist, the data of the left elbow, the data of the right wrist, and the data of the right elbow for the third worker respectively to the first RNN part 210, the second RNN part 220, the fourth RNN part 240, and the fifth RNN part 250.

Thereby, the aspect needing improvement is detected for the actions of each body part of the third worker. The aspect needing improvement is detected for the action of the left arm in which the left wrist and the left elbow are combined. The aspect needing improvement is detected for the action of the right arm in which the right wrist and the right elbow are combined. Further, the aspect needing improvement is detected for the action of both arms in which the left arm and the right arm are combined.

The example is not limited to the example illustrated in FIG. 11; and the detection system 100 may further acquire data based on the actions of legs, the head, and/or the torso and may analyze the action of a combination of these data.

Figure 12:
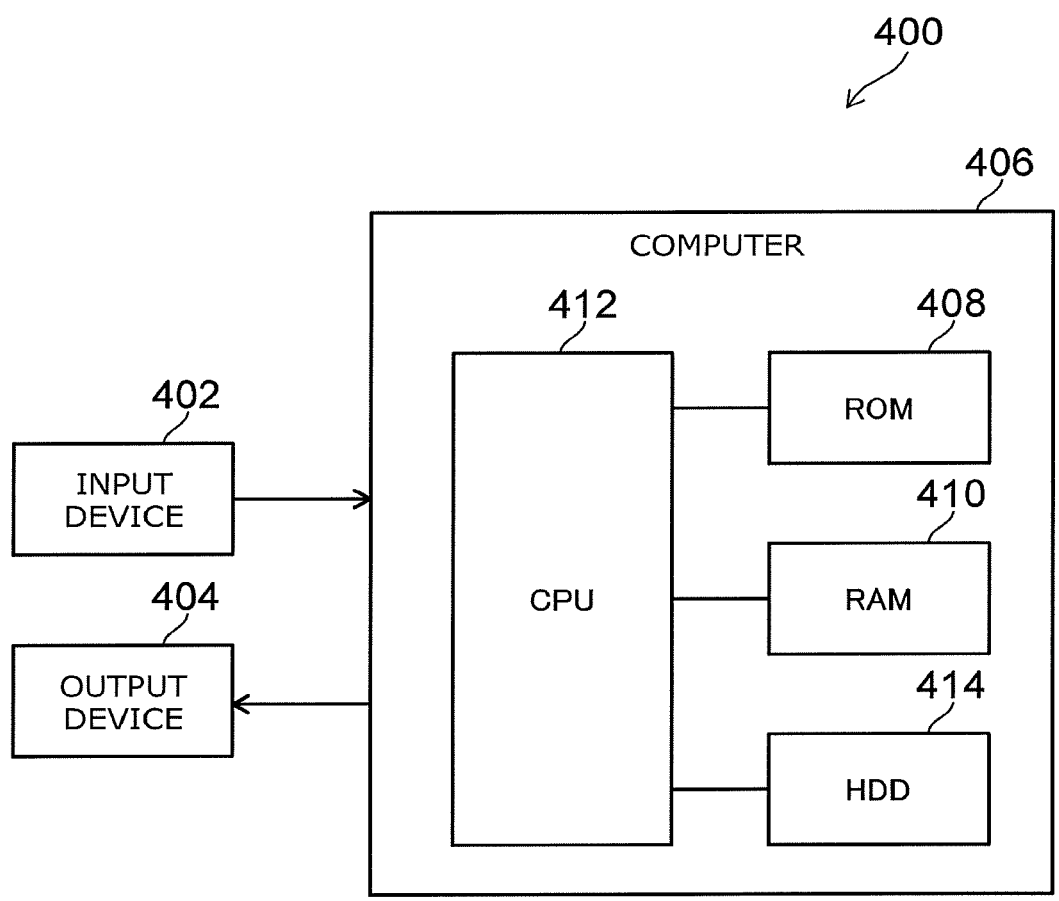
FIG. 12 is a block diagram illustrating the configuration of a detection device for realizing the detection system according to the embodiment.

FIG. 12 is a block diagram illustrating the configuration of a detection device for realizing the detection system according to the embodiment.

The detection device 400 includes, for example, an input device 402, an output device 404, and a computer 406. The computer 406 includes, for example, ROM (Read Only Memory) 408, RAM (Random Access Memory) 410, a CPU (Central Processing Unit) 412, and a memory device HDD (Hard Disk Drive) 414.

The input device 402 is for the user to perform the input of information to the detection device 400. The input device 402 is a keyboard, a touch panel, etc.

The output device 404 is for outputting the output result obtained by the detection system 100 to the user. The output device 404 is a display, a printer, etc. The output device 404 functions as the displayer 160.

The ROM 408 stores a program that controls the operation of the detection device 400. The program that is necessary for causing the computer 406 to function as the acquirer 110, the trainer 130, and the detector 150 illustrated in FIG. 1 is stored in the ROM 408.

The RAM 410 functions as a memory region where the program stored in the ROM 408 is implemented. The CPU 412 reads the control program stored in the ROM 408 and controls the operation of the computer 406 according to the control program. Also, the CPU 412 loads various data obtained by the operation of the computer 406 into the RAM 410. The HDD 414 functions as the action data storer 120 and the RNN storer 140 illustrated in FIG. 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. Moreover, above-mentioned embodiments can be combined mutually and can be carried out.

What is claimed is:

1. A detection system, comprising:
   circuitry configured to
   acquire first data of a time series, second data of a time series, and third data of a time series, the first data being based on an action of a first body part in a work task of a first worker having a first proficiency, the second data being based on an action of the first body part in the work task of a second worker having a second proficiency that is different than the first proficiency such that the first worker completes the work task in a shorter time than it takes for the second worker to complete the work task, the third data being based on an action of the first body part in the work task of a third worker, wherein the first data, second data and third data was acquired by mounting an accelerometer to the right wrist of each of the first worker, the second worker, and the third worker, the first data is acceleration information of the first body part in the work task of the first worker, the second data is acceleration information of the first body part in the work task of the second worker, and the third data is acceleration information of the first body part in the work task of the third worker;
   train a recurrent neural network including a first output layer, the first output layer including a first neuron and a second neuron, the circuitry training the recurrent neural network by setting a first value as teacher data in the first neuron and by inputting the first data to the recurrent neural network, the first value corresponding to the action of the first body part of the first proficiency, the circuitry training the recurrent neural network by setting a second value as teacher data in the second neuron and by inputting the second data to the recurrent neural network, the second value corresponding to the action of the first body part of the second proficiency; and
   input the third data, as a waveform of acceleration in an X-axis direction and a waveform of acceleration data in the Y-axis direction over a total time it takes for the third worker to complete the work task, to the trained recurrent neural network,
   wherein the circuitry is further configured to
   detect that at least part of the action of the third worker, during a particular time period within the total time it takes for the third worker to complete the work task, corresponds to the first proficiency when an absolute value of a first activity of the first neuron is larger than a threshold in response to the input of the waveform of acceleration in an X-axis direction and the waveform of acceleration data in the Y-axis direction, and detect that at least part of the action of the third worker, during a particular time period within the total time it takes for the third worker to complete the work task, corresponds to the second proficiency when an absolute value of a second activity of the second neuron is larger than the threshold in response to the input of the waveform of acceleration in an X-axis direction and the waveform of acceleration data in the Y-axis direction, thereby detecting, as a detection result, that said part of the action of the third worker corresponding to the second proficiency needs improvement, and
   output a display of the detection result on a display device, the displayed detection result including a part of the third data for which the first neuron or the second neuron responded, and the part of the third data is displayed to be discriminable from another part of the third data.

2. The system according to claim 1, wherein
the recurrent neural network further includes an input layer and an intermediate layer, and
the inteiriiediate layer includes a plurality of neurons having a Long Short Term Memory structure.

3. The system according to claim 1, wherein
the first body part includes a first joint,
the first data includes angle information of the first joint in the work. task of the first worker,
the second data includes angle information of the first joint in the work task of the second worker, and
the third data includes angle information of the first joint in the work task of the third worker.

4. The system according to claim 1, wherein
the circuitry further acquires fourth data of a time series, fifth data of a time series, and sixth data of a time series, the fourth data being based on an action of a second body part in the work task of the first worker, the fifth data being based on an action of the second body part in the work task of the second worker, the sixth data being based on an action of the second body part in the work task of the third worker,
the recurrent neural network includes a first recurrent neural network part including the first output layer and includes a second recurrent neural network part including a second output layer,
the circuitry trains the first recurrent neural network part using the first data and the second data,
the circuitry trains the second recurrent neural network part by inputting the fourth data to the second recurrent neural network part, the second output layer including a third neuron and a fourth neuron, a third value corresponding to the action of the second body part of the first proficiency being set as teacher data in the third neuron,
the circuitry trains the second recurrent neural network part by inputting the fifth data to the second recurrent neural network part, a fourth value corresponding to the action of the second body part of the second proficiency being set as teacher data in the fourth neuron, the circuitry inputs the sixth data to the trained second recurrent neural network part, and the circuitry detects that at least part of the action of the third worker corresponds to the first proficiency when a third activity of the third neuron is larger than the threshold and to detect that at least part of the action of the third worker corresponds to the second proficiency when a fourth activity of the fourth neuron is larger than the threshold.

5. The system according to claim 4, wherein the recurrent neural network further includes a third recurrent neural network part including a third output layer, outputs of the first recurrent neural network part and the second recurrent neural network part are input to the third recurrent neural network part, the circuitry trains the third recurrent neural network part by inputting the first data and the fourth data respectively to the first recurrent neural network part and the second recurrent neural network part, the third output layer including a fifth neuron and a sixth neuron, a fifth value corresponding to an action of a combination of the first body part and the second body part of the first proficiency being set as teacher data in the fifth neuron, the circuitry trains the third recurrent neural network part by inputting the second data and the fifth data respectively to the first recurrent neural network part and the second recurrent neural network part, a sixth value corresponding to an action of the combination of the first body part and the second body part of the second proficiency being set as teacher data in the sixth neuron, the circuitry inputs the third data and the sixth data respectively to the first recurrent neural network part and the second recurrent neural network part, and the circuitry detects that at least part of the action of the third worker corresponds to the first proficiency when a fifth activity of the fifth neuron is larger than the threshold and detects that at least part of the action of the third worker corresponds to the second proficiency when a sixth activity of the sixth neuron is larger than the threshold.

6. The system according to claim 4, wherein a first intermediate layer of the first recurrent neural network part and a second intermediate layer of the second recurrent neural network part are separated.

7. The system according to claim 1, wherein the circuitry is configured to cause the display device to display a skeletal of the third worker, a part of the skeleton is displayed to be discriminable from another part of the skeleton, and the part of the skeleton is where the first neuron or the second neuron responded.

8. The system according to claim 1, wherein the work task is performed at a manufacturing line or a manufacturing site.

9. A detection method, comprising:

acquiring first data of a time series, the first data being based on an action of a first body part in a work task of a first worker having a first proficiency;

acquiring second data of a time series, the second data being based on an action of the first body part in the work task of a second worker having a second proficiency that is different than the first proficiency such that the first worker completes the work task in a shorter time than it takes for the second worker to complete the work task, wherein the first data, second data and third data was acquired by mounting an accelerometer to the right wrist of each of the first worker, the second worker, and the third worker, the first data is acceleration information of the first body part in the work task of the first worker, the second data is acceleration information of the first body part in the work task of the second worker, and the third data is acceleration information of the first body part in the work task of the third worker;

training a recurrent neural network including a first output layer by inputting the first data to the recurrent neural network, the first output layer including a first neuron and a second neuron, a first value corresponding to the action of the first body part of the first proficiency being set as teacher data in the first neuron;

training the recurrent neural network by inputting the second data to the recurrent neural network, a second value corresponding to the action of the first body part of the second proficiency being set as teacher data in the second neuron;

acquiring third data of a time series, the third data being based on an action of the first body part in the work task of a third worker;

inputting the third data, as a waveform of acceleration in an X-axis direction and a waveform of acceleration data in the Y-axis direction over a total time it takes for the third worker to complete the work task, to the trained recurrent neural network; and detecting that at least part of the action of the third worker, during a particular time period within the total time it takes for the third worker to complete the work task, corresponds to the first proficiency when an absolute value of a first activity of the first neuron is larger than a threshold in response to the input of the waveform of acceleration in an X-axis direction and the waveform of acceleration data in the Y-axis direction, and detecting that at least part of the action of the third worker, during a particular time period within the total time it takes for the third worker to complete the work task, corresponds to the second proficiency when an absolute value of a second activity of the second neuron is larger than the threshold in response to the input of the wavefoirii of acceleration in an X-axis direction and the waveform of acceleration data in the Y-axis direction, thereby detecting, as a detection result, that said part of the action of the third worker corresponding to the second proficiency needs improvement, and outputting a display of the detection result on a display device the displayed detection result including a part of the third data for which the first neuron or the second neuron responded, and the part of the third data is displayed to be discriminable from another part of the third data.

10. The method according to claim 9, wherein the recurrent neural network further includes an input layer and an intermediate layer, and the intermediate layer includes a plurality of neurons having a Long Short Term Memory structure.

11. The method according to claim 9, wherein the first body part includes a first joint, the first data includes angle information of the first joint in the work task of the first worker, the second data includes angle information of the first joint in the work task of the second worker, and the third data includes angle information of the first joint in the work task of the third worker.

12. The method according to claim 11, wherein a first intermediate layer of the first recurrent neural network part and a second intermediate layer of the second recurrent neural network part are separated.

13. The method according to claim 9, further comprising acquiring fourth data of a time series, fifth data of a time series, and sixth data of a time series, the fourth data being based on an action of a second body part in the work task of the first worker, the fifth data being based on an action of the second body part in the work task of the second worker, the sixth data being based on an action of the second body part in the work task of the third worker;
- the recurrent neural network including a first recurrent neural network part and a second recurrent neural network part,
- the first recurrent neural network part including the first output layer,
- the second recurrent neural network part including a second output layer,
- the training of the recurrent neural network including:
  - training the first recurrent neural network part using the first data and the second data;
  - training the second recurrent neural network part by inputting the fourth data to the second recurrent neural network part, the second output layer including a third neuron and a fourth neuron, a third value corresponding to the action of the second body part of the first proficiency being set as teacher data in the third neuron; and
  - training the second recurrent neural network part by inputting the fifth data to the second recurrent neural network part, a fourth value corresponding to the action of the second body part of the second proficiency being set as teacher data in the fourth neuron,
- the inputting including further inputting the sixth data to the trained second recurrent neural network part, and
- the detecting including further detecting that at least part of the action of the third worker corresponds to the first proficiency when a third activity of the third neuron is larger than the threshold and detecting that at least part of the action of the third worker corresponds to the second proficiency when a fourth activity of the fourth neuron is larger than the threshold.

14. The method according to claim 13, wherein the recurrent neural network further includes a third recurrent neural network part,
- outputs of the first recurrent neural network part and the second recurrent neural network part are input to the third recurrent neural network part,
- the training of the recurrent neural network includes:
  - training the third recurrent neural network part by inputting the first data and the fourth data respectively to the first recurrent neural network part and the second recurrent neural network part, the third output layer including a fifth neuron and a sixth neuron, a fifth value corresponding to an action of a combination of the first body part and the second body part of the first proficiency being set as teacher data in the fifth neuron; and
  - training the third recurrent neural network part by inputting the second data and the fifth data respectively to the first recurrent neural network part and the second recurrent neural network part, a sixth value corresponding to an action of a combination of the first body part and the second body part of the second proficiency being set as teacher data in the sixth neuron, and
- the inputting includes further inputting the third data and the sixth data respectively to the first recurrent neural network part and the second recurrent neural network part, and
- the detecting includes further detecting that at least part of the action of the third worker corresponds to the first proficiency when a fifth activity of the fifth neuron is larger than the threshold and detecting that at least part of the action of the third worker corresponds to the second proficiency when a sixth activity of the sixth neuron is larger than the threshold.

15. The method according to claim 9, wherein a part of the third data for which the first neuron or the second neuron responds is displayed to be discriminable from another part of the third data.

16. The method according to claim 9, further comprising displaying a skeletal of the third worker,
- a part of the skeleton being displayed to be discriminable from another part of the skeleton,
- the part of the skeleton being where the first neuron or the second neuron responded.

* * * * *